(12) United States Patent
Morgan

(10) Patent No.: US 10,487,733 B2
(45) Date of Patent: Nov. 26, 2019

(54) MULTIPLE TURBOSHAFT ENGINE CONTROL METHOD AND SYSTEM FOR HELICOPTERS

(71) Applicant: PRATT & WHITNEY CANADA CORP., Longueuil (CA)

(72) Inventor: Keith Morgan, Westmount (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 377 days.

(21) Appl. No.: 15/223,030

(22) Filed: Jul. 29, 2016

(65) Prior Publication Data

US 2016/0333782 A1 Nov. 17, 2016

Related U.S. Application Data

(62) Division of application No. 13/312,232, filed on Dec. 6, 2011, now Pat. No. 9,429,077.

(51) Int. Cl.

| F02C 9/42  | (2006.01) |
| F02C 6/02  | (2006.01) |
| F02C 7/36  | (2006.01) |
| F02C 9/00  | (2006.01) |
| F01D 15/10 | (2006.01) |
| F01D 25/36 | (2006.01) |
| F02C 3/10  | (2006.01) |
| F02C 3/113 | (2006.01) |
| F02C 9/56  | (2006.01) |

(52) U.S. Cl.
CPC ............... *F02C 6/02* (2013.01); *F01D 15/10* (2013.01); *F01D 25/36* (2013.01); *F02C 3/10* (2013.01); *F02C 3/113* (2013.01); *F02C 7/36* (2013.01); *F02C 9/00* (2013.01); *F02C 9/42* (2013.01); *F02C 9/56* (2013.01); *F05B 2220/309* (2013.01); *F05D 2220/329* (2013.01); *F05D 2270/053* (2013.01)

(58) Field of Classification Search
CPC .... F02C 9/28; F02C 7/26; F02C 7/268; F02C 7/262; F02C 7/36; F02C 6/02; F02C 9/42; F05B 2220/309; H02K 7/18; H02K 7/1823; F01D 15/10; F01D 15/12
See application file for complete search history.

(56) References Cited

U.S. PATENT DOCUMENTS 2,723,531 A    11/1955   Wosika et al.
3,088,278 A *   5/1963   Franz ..................... F02C 3/145
                                                                                      415/126
3,591,843 A    7/1971   Friedrich (Continued)

OTHER PUBLICATIONS

Dubois, "Helitech 2011: Turbomeca Unveils Leads to Less Fuel-Thirsty Engines", Aviation International News, Nov. 2011, [Online], retrieved form http://www.ainonline.com/?q=aviation-news/aviation-international-news/2011-11-01/helitech.

(Continued)

*Primary Examiner* — Gerald L Sung
(74) *Attorney, Agent, or Firm* — Norton Rose Fulbright Canada LLP

(57) ABSTRACT

Electric power from the low spool of a turboshaft engine is transferred to drive the compressor of another turboshaft engine. This is used to assist in maintaining the other turboshaft idling while a single engine provides flight power or to increase acceleration for instance.

9 Claims, 2 Drawing Sheets

(56) References Cited

U.S. PATENT DOCUMENTS

| | | |
|---|---|---|
| 3,869,862 A | 3/1975 | Dickey |
| 3,930,366 A | 1/1976 | Nelson |
| 3,938,320 A | 2/1976 | Nelson |
| 3,983,693 A | 10/1976 | Werner |
| 4,147,035 A | 4/1979 | Moore et al. |
| 4,254,619 A | 3/1981 | Giffin, III et al. |
| 4,414,804 A | 11/1983 | Menard et al. |
| 5,309,029 A | 5/1994 | Gregory et al. |
| 5,331,935 A | 7/1994 | Daino |
| 5,343,778 A | 9/1994 | Romero et al. |
| 5,419,112 A | 5/1995 | Farrell |
| 5,546,742 A | 8/1996 | Shekhawat et al. |
| 5,694,765 A | 12/1997 | Hield et al. |
| 5,818,115 A | 10/1998 | Nagao |
| 5,899,411 A | 5/1999 | Latos et al. |
| 6,467,725 B1 | 10/2002 | Coles et al. |
| 6,639,328 B2 | 10/2003 | Wacknov |
| 6,768,277 B2 | 7/2004 | Ichinose et al. |
| 6,895,741 B2 | 5/2005 | Rago et al. |
| 6,909,263 B2 | 6/2005 | Xu et al. |
| 6,979,979 B2 | 12/2005 | Xu et al. |
| 6,989,610 B2 | 1/2006 | Gupta et al. |
| 7,111,462 B2 | 9/2006 | Epstein |
| 7,462,970 B2 | 12/2008 | Hoff et al. |
| 7,481,062 B2 | 1/2009 | Gaines et al. |
| 7,513,119 B2 | 4/2009 | Zielinski et al. |
| 7,552,582 B2 | 6/2009 | Eick et al. |
| 7,661,271 B1 | 2/2010 | Millsaps, Jr. |
| 7,690,186 B2 | 4/2010 | Dooley |
| 7,770,377 B2 | 8/2010 | Rolt |
| 7,786,708 B2 | 8/2010 | Rozman et al. |
| 7,802,757 B2 | 9/2010 | Dooley et al. |
| 7,841,163 B2 | 11/2010 | Welch et al. |
| 7,952,221 B2 | 5/2011 | Divito et al. |
| 8,492,915 B2 | 7/2013 | Koeppen et al. |
| 9,267,438 B2 | 2/2016 | Dooley et al. |
| 2002/0171005 A1 | 11/2002 | Claudet |
| 2004/0031880 A1 | 2/2004 | Stemme et al. |
| 2006/0225431 A1 | 10/2006 | Kupratis |
| 2008/0093850 A1 | 4/2008 | Taneja et al. |
| 2008/0276620 A1 | 11/2008 | Ullyott |
| 2009/0007569 A1 | 1/2009 | Lemmers, Jr. et al. |
| 2009/0113871 A1 | 5/2009 | Certain |
| 2010/0038961 A1 | 2/2010 | Divito et al. |
| 2010/0058731 A1 | 3/2010 | Haehner et al. |
| 2010/0252688 A1 | 10/2010 | Koeppen et al. |
| 2010/0319357 A1 | 12/2010 | Gazzino et al. |
| 2013/0086919 A1 | 4/2013 | Dooley et al. |
| 2013/0139518 A1 | 6/2013 | Morgan |
| 2013/0219905 A1 | 8/2013 | Marconi et al. |
| 2015/0322684 A1 | 11/2015 | Dooley et al. |

OTHER PUBLICATIONS

European Search Report dated Mar. 8, 2017 in connection with European Patent Application No. 12182404.9.

* cited by examiner

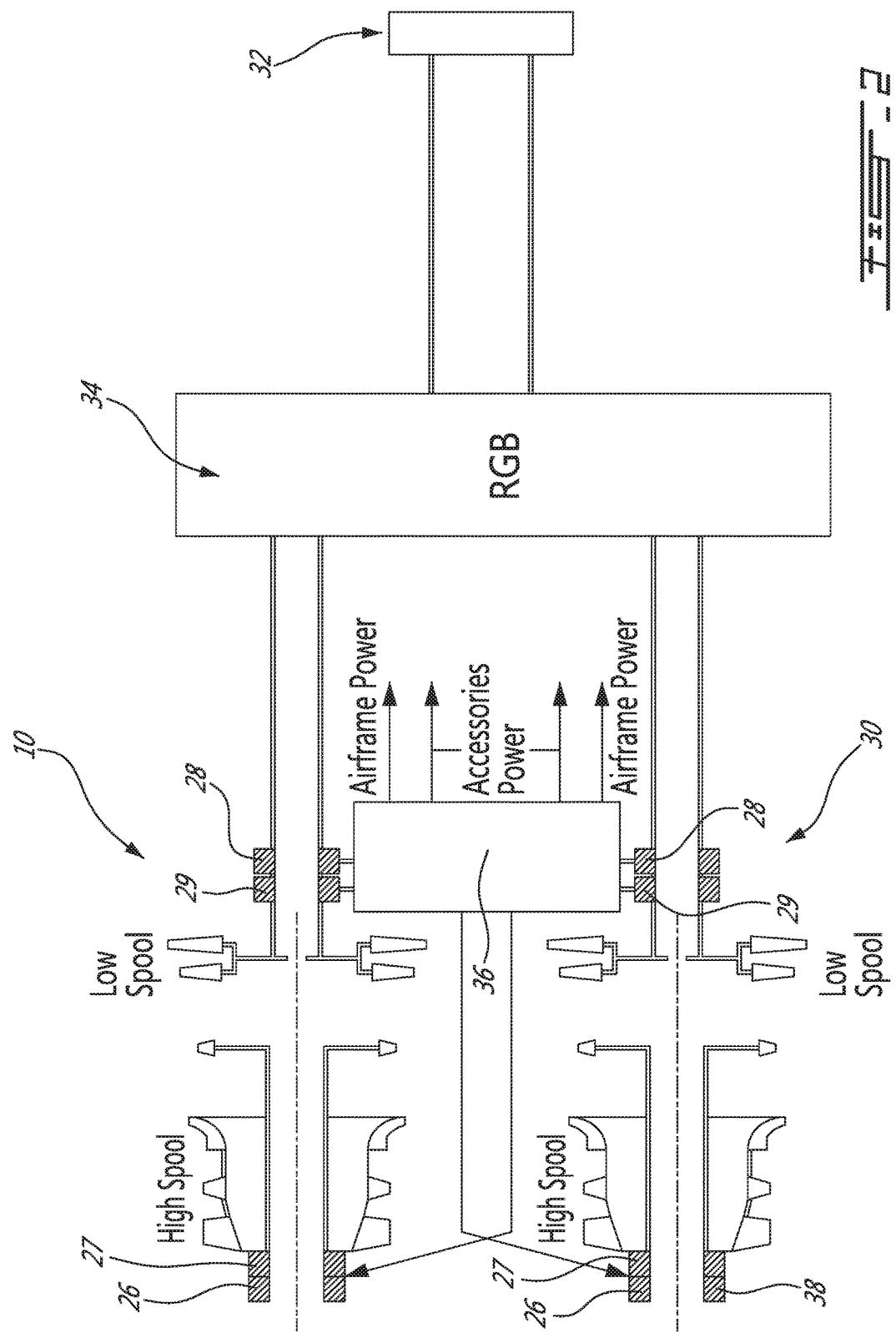

MULTIPLE TURBOSHAFT ENGINE CONTROL METHOD AND SYSTEM FOR HELICOPTERS

CROSS-REFERENCE TO RELATED APPLICATIONS

This application is a divisional of U.S. application Ser. No. 13/312,232 filed Dec. 6, 2011, entitled "Multiple Turboshaft Engine Control Method and System for Helicopters" the entire contents of which is hereby incorporated by reference.

TECHNICAL FIELD

The application relates generally to the management of a multiple turboshaft arrangement in a helicopter, more particularly, involving electrical power transfer between engines.

BACKGROUND OF THE ART

Helicopters are often provided with at least two turboshaft engines. Both engines are connected to the main rotor via a common reduction gearbox, and each of the engines is sized to account for the worst-case scenario of the other engine failing at takeoff. Accordingly, the power of each engine is significantly greater than what is required for cruising.

In cruising conditions, operating a single engine at a relatively high regime instead of both at a lower regime can allow significantly better fuel efficiency. However, once a turboshaft is stopped, there is a significant delay in starting it back up again. This delay is associated with the required amount of time to get the engine running at a sufficient RPM (and draw in a sufficient amount of air) for engine operation to begin. Henceforth, for safety purposes, the typical approach was not to shut down the second engine completely, but to keep it idling, which limited the gain in fuel efficiency.

Accordingly, there remains room for improvement in addressing the fuel consumption of helicopters.

SUMMARY

In one aspect, there is provided a method of controlling operation of an arrangement having at least a first turboshaft engine and a second turboshaft engine of a helicopter, each turboshaft engine having a first electric machine on a compressor spool, the compressor spool having both at least one turbine stage and at least one compressor stage, and a second electric machine on a power spool, the power spool having a low-pressure turbine stage, the method comprising: extracting electrical power from the power spool of the first turboshaft engine using the second electric machine of the first turboshaft engine, and the first electric machine of the second turboshaft engine imparting mechanical rotation power to the corresponding compressor spool using a portion of the extracted electrical power.

In a second aspect, there is provided a system for a helicopter having least two turboshaft engines, the system comprising, for each turboshaft engine, a first electric machine on a compressor spool linking at least one turbine stage to at least one compressor stage, a second electric machine on a power spool having a low-pressure turbine stage, and a controller connected to each electric machine, the controller being operable to transfer at least a portion of electrical power obtained from the second electric machine of either one of the two turboshaft engines to the first electric machine of the other turboshaft engine to impart mechanical rotation power to the corresponding compressor spool.

In a third aspect, there is provided a helicopter having least two turboshaft engines, each turboshaft engine having a first electric machine on a compressor spool linking at least one turbine stage to at least one compressor stage, a second electric machine on a power spool having a low-pressure turbine stage, and a controller connected to each electric machine, the controller being operable to transfer at least a portion of electrical power obtained from the second electric machine of either one of the two turboshaft engines to the first electric machine of the other turboshaft engine to impart mechanical rotation power to the corresponding compressor spool.

Further details of these and other aspects of the present invention will be apparent from the detailed description and figures included below.

DESCRIPTION OF THE DRAWINGS

Reference is now made to the accompanying figures, in which:

FIG. 2 is a schematic view showing two turboshaft engines in a twin-pac helicopter arrangement.

DETAILED DESCRIPTION

Figure 1:
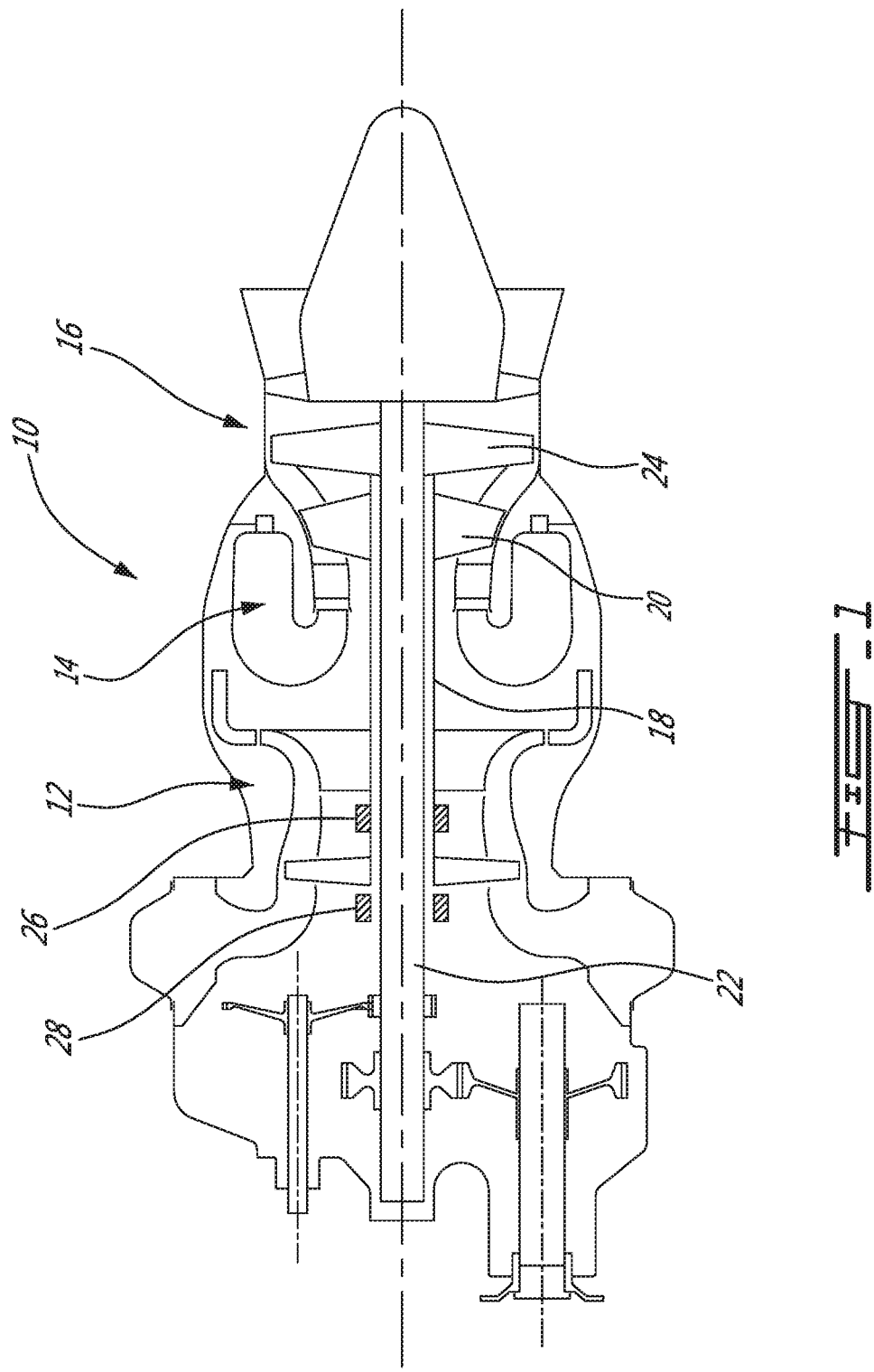
FIG. 1 is a schematic cross-sectional view of a gas turbine engine.

FIG. 1 illustrates an example of a turbine engine. In this example, the turbine engine 10 is a turboshaft engine generally comprising in serial flow communication, a multistage compressor 12 for pressurizing the air, a combustor 14 in which the compressed air is mixed with fuel and ignited for generating an annular stream of hot combustion gases, and a turbine section 16 for extracting energy from the combustion gases.

The turbine engine 10 in this example can be seen to include a high pressure spool 18, including a multistage compressor 12 and a high-pressure turbine stage 20, and a low pressure spool 22, including a low-pressure turbine stage 24. The low spool 22 leads to a power shaft via a gear arrangement. The high spool 18 can be refer to herein as a compressor spool, given that it contains at least one compressor stage, and the low spool 22 can be referred to herein as the power spool.

In this example, the turbine engine 10 is of the more-electric engine type which uses spool-mounted electric machines to power aircraft equipment. A first electric machine 26 is provided on the high spool 18 and a second electric machine 28 is on the low spool 22.

The first electric machine 26 can be of the spool-mounted permanent magnet type and be referred to as an integrated starter/generator (ISG). The first electric machine 26 is used in starting the turbine engine 10 to drive the high spool 18, and hence the multistage compressor 12 to cause a flow of air to enter the combustor, thereby allowing subsequent fuel admission and ignition. The first electric machine 26 may also operate in generator mode.

The second electric machine 28 can also be of the spool-mounted permanent magnet type. Although the construction of the second electric machine 28 can typically allow its use in either one of generator or motor mode it is typically only used in generator mode and can thereby be referred to as a low spool generator (LSG). The power capacity of the low spool generator is typically at least one order of magnitude higher than the power capacity of the integrated starter/generator.

FIG. 2 schematically shows an arrangement of two turboshaft engines in a twin-pac arrangement. Both turboshaft engines 10, 30 may be the same and are both connected to the helicopter main rotor 32 via a common reduction gearbox 34. Each turboshaft engine 10, 30 includes two electric machines 26, 27 or 28, 29 positioned adjacent one another along a corresponding spool.

When the helicopter is cruising, a first one 10 of the two turboshaft engines is operated to provide flight power at the main rotor 32, whereas the second one 30 of the two turboshaft engines can be idling. In these conditions, the twin-pac arrangement has a system by which a controller 36 associated with power electronics can transfer electric power extracted by the low spool generator 28 of the operating engine to the integrated starter/generator 38 of the idling engine 30 to assist in driving the high spool thereof, and therefore the compressor. This can allow gaining further fuel efficiency than having the idling engine 30 run entirely on fuel power. It will be understood that the operating engine and idling engine were selected arbitrarily in this example and that the controller can provide the same power transfer function independently of which engine is being operated.

The system can also be used to transfer electrical energy in a comparable manner (i.e. from the low spool generator of one engine to the integrated starter/generator of the other) in a scenario where there is a significant difference in the RPM of both engines and there is a rapid rise in power requirement, independently of whether the second engine is idling or not. In fact, driving the compressor spool with an external power source such as electrical energy diverted from the low spool generator of the other engine can favourably affect the surge line, thereby increasing the compressor stall margin, and allowing for better acceleration time. This can be particularly useful during landing, for instance.

The above description is meant to be exemplary only, and one skilled in the art will recognize that changes may be made to the embodiments described without departing from the scope of the invention disclosed. For example, a helicopter can have more than two engines, in which case the power can be transferred between any two engines of the helicopter as desired. Further, although turboshaft engines have only one spool leading to the power shaft (referred to herein as the low spool or power spool), alternate embodiments can have more than one compressor spool (i.e. a spool having at least one stage of compressor blades in addition to turbine blades), such as an intermediate spool and a high spool for instance, in which case, the electric machine to which the electrical power is transferred to can be on either one of the compressor spools, depending on design requirements. Also, the electric machines referred to in the description provided above can either be unitary electric machines, or dual redundant electric machines to provide additional safety. Still other modifications which fall within the scope of the present invention will be apparent to those skilled in the art, in light of a review of this disclosure, and such modifications are intended to fall within the scope of the appended claims.

What is claimed is:

1. A system for a helicopter having a first turboshaft engine and a second turboshaft engine, the system comprising:
    for each one of the first turboshaft engine and the second turboshaft engine:
        a first electric machine on a compressor spool linking at least one turbine stage to at least one compressor stage; and
        a second electric machine on a power spool having a low-pressure turbine stage; and
    a controller connected to the first electric machine and the second electric machine of the first turboshaft engine and the second turboshaft engine, the controller configured for:
        determining an increase in a power requirement and a difference in revolutions per minute between the first turboshaft engine and the second turboshaft engine;
        upon determining, extracting electrical power from the power spool of the first turboshaft engine using the second electric machine of the first turboshaft engine; and
        driving the compressor spool of the second turboshaft engine using a portion of the extracted electrical power from the power spool of the first turboshaft engine.

2. The system of claim 1, wherein the power capacity of the second electric machine of the first turboshaft engine or the second turboshaft engine is greater than the power capacity of the first electric machine of a same one of the first turboshaft engine or the second turboshaft engine by at least an order of magnitude.

3. The system of claim 1, wherein the power spool of each the first turboshaft engine and the second turboshaft engine is connected to a helicopter main rotor via a common reduction gearbox.

4. The system of claim 1, wherein, for each one of the first turboshaft engine and the second turboshaft engine, the first electric machine and the second electric machine each include two adjacent electric machines positioned along a corresponding spool.

5. The system of claim 1, wherein the controller is integrated to power electronics.

6. The system of claim 1, wherein the second turboshaft engine is maintained in idle operation at least in part by the first electric machine of the second turboshaft engine.

7. The system of claim 1, where the controller is further operable for transferring a portion of the extracted electrical power from the power spool of the first turboshaft engine to the first electric machine of the second turboshaft engine.

8. The system of claim 7, wherein said transferring is effected upon determining that one of the first turboshaft engine and the second turboshaft engine is active and the other one of the first turboshaft engine and the second turboshaft engine is idling.

9. The system of claim 8, wherein the controller is further operable for reducing a rate of fuel feed to the one of the first turboshaft engine and the second turboshaft engine that is idling during said transferring.

* * * * *